Dec. 15, 1959     A. F. MAGARACI     2,917,690
QUADRATURE VOLTAGE ELIMINATING MOTOR CONTROL CIRCUIT
Filed April 27, 1955     3 Sheets-Sheet 1

INVENTOR
ANTHONY F. MAGARACI
BY
ATTORNEYS

Dec. 15, 1959     A. F. MAGARACI     2,917,690
QUADRATURE VOLTAGE ELIMINATING MOTOR CONTROL CIRCUIT
Filed April 27, 1955     3 Sheets-Sheet 2

INVENTOR
ANTHONY F. MAGARACI
BY George Lipkin
Leo J. Hirtzberger
ATTORNEYS

Dec. 15, 1959  A. F. MAGARACI  2,917,690
QUADRATURE VOLTAGE ELIMINATING MOTOR CONTROL CIRCUIT
Filed April 27, 1955  3 Sheets-Sheet 3

United States Patent Office 2,917,690
Patented Dec. 15, 1959

2,917,690

QUADRATURE VOLTAGE ELIMINATING MOTOR CONTROL CIRCUIT

Anthony F. Magaraci, New London, Conn., assignor to the United States of America as represented by the Secretary of the Navy Application April 27, 1955, Serial No. 504,385

16 Claims. (Cl. 318—30)

(Granted under Title 35, U.S. Code (1952), sec. 266)

The invention described herein may be manufactured and used by or for the Government of the United States of America for governmental purposes without the payment of any royalties thereon or therefor.

This invention concerns quadrature voltage eliminating circuits which introduce negligible time delay.

A type of synchro unit, well known in the art and widely used in automatic control systems, is the control transformer. The control transformer unit supplies, from its rotor terminals, an A.C. voltage whose magnitude and phase polarity depend upon the position of its rotor and on the voltages applied to its stator windings. It is designed with high impedance stator coils, which draw relatively little current, and its output is usually connected to a high impedance load such as the grid circuit of a vacuum tube.

For use in automatic control systems, a control transformer is ordinarily, as is well known in the art, connected by its stator leads to the stator leads of a synchro generator. On the assumption that the Y positioned stator coils of the control transformer are so placed that coil number one is at 240 degrees with the positive ordinate through the common terminal of the Y, coil number two is at zero degrees with said positive ordinate and coil number three is at 120 degrees with said positive ordinate, the control transformer operates as follows:

Theoretically, when the shaft of the control transformer is in the electrical zero position, so that its rotor coil is at 90 degrees with the positive ordinate through the Y positioned stator, no voltage is induced in the rotor coil by stator coil number two, since these two coils are perpendicular to each other. Since equal currents flow in coils one and three they induce equal and opposite voltages in the rotor coil. The net induced voltage in the rotor coil is zero and no voltage appears between the rotor coil terminals.

When the synchro generator-control transformer combination is used, in a manner known in the art, in automatic control systems, the shaft of the synchro generator, which bears the generator rotor coil, may be hand-rotated to ordered position points for the equipment under control; the shaft of the control transformer, which bears the control transformer rotor coil, is positioned by the equipment under control.

If the equipment under control varies from its ordered position, throughout its entire error range, and if the rotor coil of the synchro generator is maintained at zero degrees position, then the equipment under control varies from zero to 360 degrees out of position, thus positioning the control transformer rotor coil from zero to 360 degrees. Theoretically, the voltage across the terminals of the control transformer rotor coil varies in sinusoidal function as the position error increases. Thus, as the rotor coil of the control transformer is positioned from zero to 360 degrees, the voltage across its rotor coil terminals increases sinusoidally in positive, in-phase fashion from zero value at zero degrees position to a maximum value at 90 degrees position and decreases sinusoidally in positive, in-phase fashion from 90 degrees to zero value at 180 degrees position. The voltage across the control transformer rotor coil terminals increases sinusoidally in negative, out-of-phase fashion from zero value at 180 degrees position to a maximum value at 270 degrees position and decreases sinusoidally in negative, out-of-phase fashion from 270 degrees to zero value at 360 degrees position.

The control transformer thus produces a voltage whose magnitude and phase vary with the position error between the equipment under control and the ordered position for such equipment.

In actual operation, when the position error is small enough to be in the vicinity of zero, there is a higher voltage across the control transformer rotor coil terminals than is theoretically expected; in fact, if the position error drops down close enough to zero the voltage across the rotor coil remains at a set value and does not decrease to zero as expected. Thus, as the position error approaches zero, there is poor resolution in the system and the accuracy of the system is impaired.

The voltage across the rotor coil at zero position error is called the quadrature voltage since it is a cosine component. The presence of the quadrature voltage in the voltage across the rotor coil of the control transformer causes overloading of the servo amplifier, to which it is applied, and to the servo motor, which is driven by the servo amplifier.

The principal object of this invention is the provision of a circuit for the elimination of the quadrature component of a voltage.

An object of this invention is the provision of a circuit for the elimination of the quadrature component of the output voltage of a control transformer.

An object of this invention is the provision of a circuit for the elimination of the quadrature component of the output voltage of a control transformer in a carrier type servo system.

An object of this invention is the provision of a quadrature voltage eliminating circuit which reduces random noise.

An object of this invention is the provision of a quadrature voltage eliminating circuit of simple configuration and efficient operation.

An object of this invention is the provision of a quadrature voltage eliminating circuit incorporating a noncarrier type compensation circuit.

An object of this invention is the provision of a quadrature voltage eliminating circuit, for use with a carrier type servo system, which introduces little or no attenuation or phase shift of the system modulation.

An object of this invention is the provision of a quadrature voltage eliminating circuit, for use with a carrier type servo system, which incorporates noncarrier type compensation in the system.

An object of this invention is the provision of a servo system having good resolution, especially at small position errors.

Another object of this invention is the provision of a servo system having little or no overloading of the servo amplifier.

A further object of this invention is the provision of a servo system having little or no overloading of the servo motor.

Other objects and many of the attendant advantages of this invention will be readily appreciated as the same becomes better understood by reference to the following detailed description when considered in connection with the accompanying drawing wherein.

Figure 1:
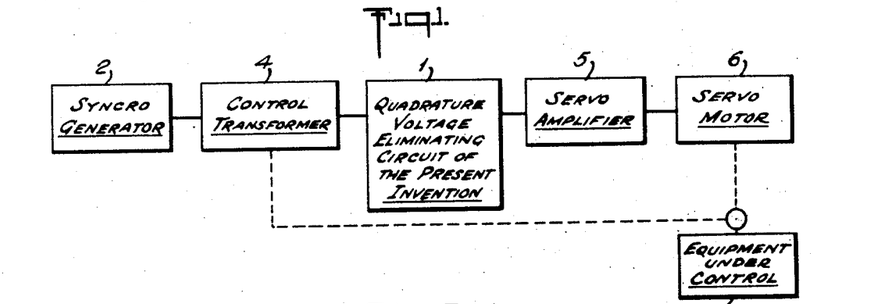
Fig. 1 is an automatic control system utilizing the quadrature voltage eliminating circuit of the present invention.

Fig. 1 is an automatic control system utilizing the quadrature voltage eliminating circuit of the present invention. The automatic control system of Fig. 1, except for the quadrature voltage eliminating circuit of the present invention 1, is one which is well known in the art. The quadrature voltage eliminating circuit of the present invention 1 may be employed in any suitable automatic control or servo system known in the art.

As is well known in the art, the rotor coil of the synchro generator 2 may be manually or automatically moved to the ordered position for the equipment under control 3, which may be any suitable equipment whose position is to be controlled. The stator coils of the synchro generator are electrically connected to the stator coils of the control transformer 4 in a manner well known in the art. The output voltage on the rotor coil of the control transformer 4 is applied to the input of the quadrature voltage eliminating circuit of the present invention 1. The output of the quadrature voltage eliminating circuit of the present invention 1 is electrically fed to the servo amplifier 5 which drives the servo motor 6 in a manner well known in the art. The servo motor 6 is mechanically coupled to the equipment under control 3 and to the rotor coil of the control transformer 4.

The operation of the automatic control system of Fig. 1 without the quadrature voltage eliminator is known in the art. The synchro generator 2 rotor coil is moved to the position to which the equipment under control 3 is ordered. The equipment under control 3 mechanically moves the control transformer 4 rotor coil to its own position. Thus, if the equipment under control 3 is not at its ordered position the control transformer 4 rotor coil is in a position which varies from that of the synchro generator 2 rotor coil by the magnitude of the position error between the ordered and actual position of the equipment under control. The positional variation between the rotor coil of the synchro generator 2 and the rotor coil of the control transformer 4 produces a correcting voltage across the terminals of the control transformer rotor coil in a manner well known in the art.

In the absence of the quadrature voltage eliminating circuit of the present invention 1, as in an automatic control or servo system of a type well known in the art, the correcting voltage is applied to the servo amplifier 5 which amplifies it to a magnitude sufficient to drive the servo motor 6. The servo motor 6 mechanically positions the equipment under control 3 to its ordered position.

The quadrature voltage eliminating circuit of the present invention 1 operates to conduct the correcting voltage from the terminals of the control transformer 4 rotor coil to the input of the servo amplifier 5. The manner of conduction of the correcting voltage by the quadrature voltage eliminating circuit of the present invention is described in conjunction with Fig. 2.

Figure 2:
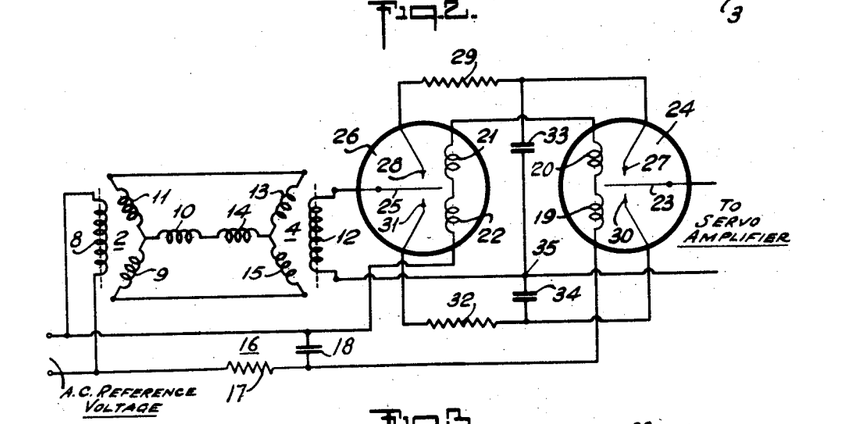
Fig. 2 is a preferred embodiment of the quadrature voltage eliminating circuit of the present invention.

The synchro generator 2, having a rotor coil 8 and stator coils 9, 10 and 11 and the control transformer 4, having a rotor coil 12 and stator coils 13, 14 and 15 are electrically connected, as described in conjunction with Fig. 1, and serve to produce a correcting voltage across the terminals of the control transformer rotor coil 12, as described in conjunction with Fig. 1.

In a carrier type automatic control or servo system, the A.C. reference voltage is the carrier, which is modulated in amplitude in order to control the servo motor 6 (shown in Fig. 1). The A.C. reference voltage is applied by conductor lines directly to the rotor coil 8 of the synchro generator 2. The A.C. reference signal is fed through the phase shifter 16 which comprises a resistor 17 in series in one of said lines after the connection of said lines to coil 8 and a capacitor 18 connected in shunt across said lines furnishing said A.C. reference voltage after their connection to the coil 8. After passing through the phase shifter 16 the A.C. reference signal is conducted through the series connected relay coils 19, 20, 21 and 22. Relay coils 19 and 20 are in cooperative relation with the armature 23 of the output relay switch unit, or chopper unit, 24. Relay coils 21 and 22 are in cooperative relation with the armature 25 of the input relay switch unit, or chopper unit, 26. The upper contact 27 of the output relay switch unit 24 is electrically connected to the upper contact 28 of the input relay switch unit 26, through the upper resistor 29. The lower contact 30 of the output relay switch unit 24 is electrically connected to the lower contact 31 of the input relay switch unit 26, through the lower resistor 32.

The upper capacitor 33 and the lower capacitor 34 are series connected across the lines connecting the contacts 27 and 28 and the contacts 30 and 31. The armature 25 of the input relay switch unit 26 is electrically connected to one terminal of the rotor coil 12 of the control transformer 4. The other terminal of the rotor coil 12 is electrically connected to an input terminal of the servo amplifier 5 (shown in Fig. 1), through a common contact point 35 on the line connecting the capacitors 33 and 34. The armature 23 of the output relay switch unit 24 is electrically connected to the other input terminal of the servo amplifier.

Figure 6:
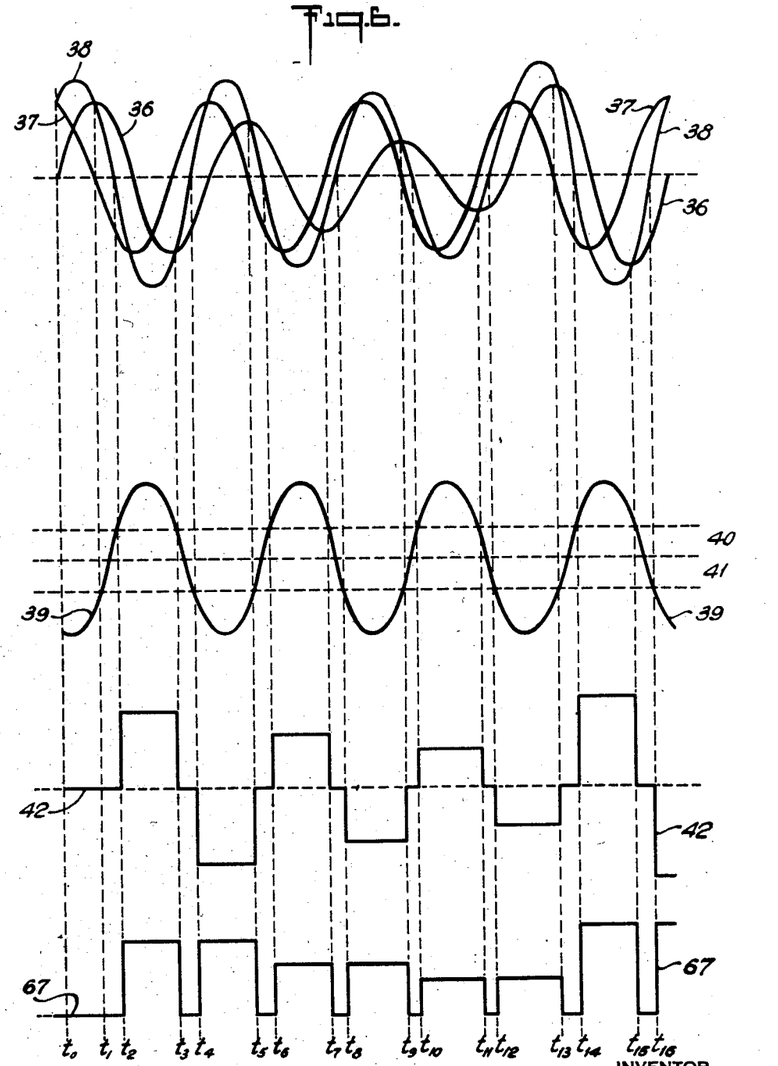
Fig. 6 is a graphic presentation of the operation of the quadrature voltage eliminating circuit of the present invention.

The operation of the quadrature voltage eliminating circuit of Fig. 2 is best described first in conjunction with the curves of Fig. 6. Fig. 6 is a graphic presentation of the operation of the quadrature voltage eliminating circuit of the present invention. In Fig. 6 the curve 36 represents the amplitude modulated sine component of the voltage across the terminals of the rotor coil 12 of the control transformer 4 which is the desired component of the voltage at coil 12. The curve 37 represents the substantially constant amplitude cosine function which is the quadrature or unwanted component of the voltage across the control transformer 4 rotor coil 12 terminals. The curve 38 represents the sinusoidal input signal voltage across the terminals of the rotor coil 12; it is the algebraic sum of the sine component, represented by curve 36, and the cosine component, represented by curve 37, of the voltage across said rotor coil terminals.

The curve 39, of Fig. 6, represents the switching signal fed through the relay coils 19, 20, 21 and 22 of the relay switch units 24 and 26, respectively. The magnitudes 40 and 41 represent the current required to actuate said relay coils. The currents 40 and 41 are equal in magnitude, but of opposite polarity.

Figure 3:
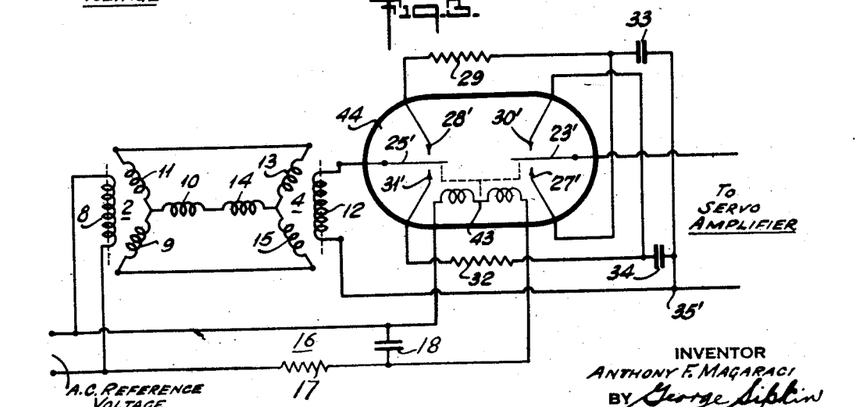
Fig. 3 is a modification of the preferred embodiment of the quadrature voltage eliminating circuit of Fig. 2.
Figure 5:
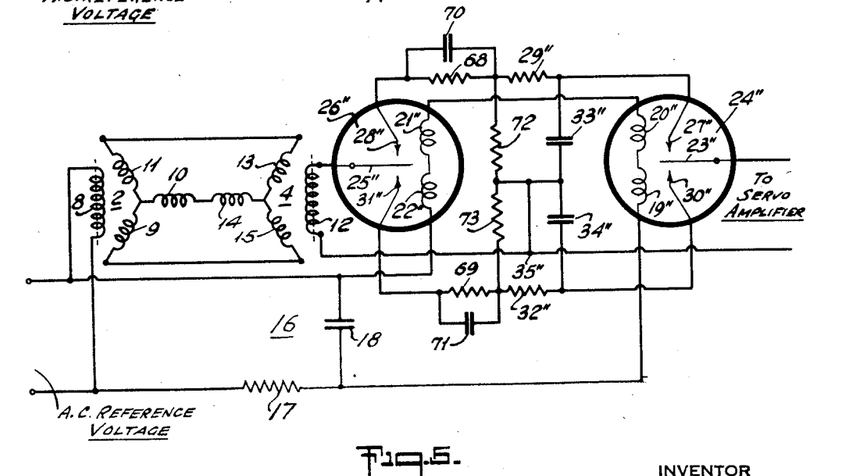
Fig. 5 is an embodiment of the quadrature voltage eliminating circuit of the present invention incorporating non-carrier type compensation.

The curve 42, of Fig. 6, represents the circuit output of the quadrature voltage eliminating circuit of the present invention, shown in Figs. 2, 3 and 5, which is fed to the servo amplifier 5 (shown in Fig. 1). The time intervals $t_0$, $t_1$, $t_2$, $t_3$, $t_4$, $t_5$, $t_6$, $t_7$, $t_8$, $t_9$, $t_{10}$, $t_{11}$, $t_{12}$, $t_{13}$, $t_{14}$, $t_{15}$ and $t_{16}$ determine the control operation of the quadrature voltage eliminating circuit of the present invention.

The operation of the quadrature voltage eliminating circuit of Fig. 2 is as follows. The synchro generator 2 and control transformer 4 operate in a manner known in the art, to produce an amplitude modulated voltage, represented by the input signal curve 38 of Fig. 6, across the terminals of the rotor coil 12 of the control transformer. The undesirable quadrature voltage component, represented by the cosine component curve 37 of Fig. 6, is included in the input signal curve 38. The A.C. reference signal, which energizes the synchro generator, is phase-shifted by the phase shifter 16 to produce the switching signal, represented by the switching signal curve 39 of Fig. 6, which actuates the relay coils 19, 20, 21 and 22 at the proper time intervals determined by the sine component curve 36 and the input signal curve 38.

The magnitudes 40 and 41, shown with the switching signal curve 39, represent the current required to actuate the relay coils 19, 20, 21 and 22. That is, the current magnitudes 40 and 41, or 40 and −40, represent the current which must flow through any of the relay coils 19, 20, 21 or 22 before the relay coil through which it flows is actuated to draw its cooperating armature into contact with its adjacent contact. Thus, the relay coils 19 and 20 are actuated either to close the armature 23 of the output relay switch unit 24 to contact 30 and the relay coils 21 and 22 are actuated to close the armature 25 of the input relay switch unit 26 to contact 28 or the relay coils 19 and 20 are actuated to close the armature 23 of the output relay switch unit 24 to contact 27 and the relay coils 21 and 22 are actuated to close the armature 25 of the input relay switch unit 26 to contact 31.

Since the reference signal is A.C. its polarity varies from positive to negative each cycle. Since the relay coils 19, 20, 21 and 22 are all series connected, in the order listed, during one half of each cycle of the switching signal curve 39, the lower terminals of the relay coils 19 and 20 are positively polarized and the lower terminals of the relay coils 21 and 22 are negatively polarized. During this half of the cycle, the upper terminals of the relay coils 19 and 20 are negatively polarized and the upper terminals of the relay coils 21 and 22 are positively polarized. During the next half cycle of the switching signal curve 39, the lower terminals of the relay coils 19 and 20 are negatively polarized and the lower terminals of the relay coils 21 and 22 are positively polarized; during this half of the cycle, the upper terminals of the relay coils 19 and 20 are positively polarized and the upper terminals of the relay coils 21 and 22 are negatively polarized. Thus, relay coil 19 and relay coil 21 operate together to close their respective armatures to the contact 30 and the contact 28, respectively, and relay coil 20 and relay coil 22 operate together to close their respective armatures to the contact 27 and the contact 31, respectively.

The reference signal is phase shifted by the phase shifter 16 by an amount determined by the sine component curve 36 and the input signal curve 38 to form the switching signal curve 39. The amount of phase shift is so determined that the switching signal actuates the relay coil 19 to close the armature 23 to the contact 30 and actuates the relay coil 21 to close the armature 25 to the contact 28, at the time $t_0$ and to keep them closed until the time $t_1$. The armatures 23 and 25 break contact with their respective contacts 30 and 28 at the time $t_1$. At the time $t_2$, the switching signal actuates the relay coil 20 to close the armature 23 to the contact 27 and actuates the relay coil 22 to close the armature 25 to the contact 31 and to keep them closed until the time $t_3$. The armatures 23 and 25 break contact with their respective contacts 27 and 31 at the time $t_3$. At the time $t_4$, the switching signal actuates the relay coil 19 to close the armature 23 to the contact 30 and actuates the relay coil 21 to close the armature 25 to the contact 28, and to keep them closed until the time $t_5$. At the time $t_5$, the armatures 23 and 25 break contact with their respective contacts 30 and 28. At the time $t_6$, the switching signal actuates the relay coil 20 to close the armature 23 to the contact 27 and actuates the relay coil 22 to close the armature 25 to the contact 31 and to keep them closed until the time $t_7$. At the time $t_7$, the armatures 23 and 25 break contact with their respective contacts 27 and 31. The cycle described repeats itself as long as the circuit of Fig. 2 is in operation. Throughout its operation, the circuit functions as described, similarly at times $t_1$ and $t_5$ and $t_9$, $t_{13}$ . . . . The circuit functions similarly at times $t_2$, $t_6$, $t_{10}$, $t_{14}$ . . . . The circuit functions similarly at times $t_3$, $t_7$, $t_{11}$, $t_{15}$ . . . . The circuit functions similarly at times $t_4$, $t_8$, $t_{12}$, $t_{16}$ . . . .

The time $t_0$ is the instant of commencement of operation of the circuit of Fig. 2 from an inoperative condition. The time $t_1$ is the time at which the maximum positive magnitude of the sine component curve 36 occurs in its first cycle. The time $t_2$ is the time at which the input signal curve 38 changes from a positive to a negative value in its first cycle. The time $t_3$ is the time at which the maximum negative magnitude of the sine component curve 36 occurs in its first cycle. The time $t_4$ is the time at which the input signal curve 38 changes from a negative to a positive value in ending its first cycle and commencing its second cycle. The time $t_5$ is the time at which the maximum positive magnitude of the sine component curve 36 occurs in its second cycle. The time $t_6$ is the time at which the input signal curve 38 changes from a positive to a negative value in its second cycle. The time function follows in cyclical sequence for as long as the circuit of Fig. 2 is in operation.

The capacitors 33 and 34 and the resistors 29 and 32 are so selected that each capacitor charges to the peak value of the signal from the time $t_0$ to the time $t_1$. The capacitor 33 is charged to the peak value of the signal from the time $t_0$ to the time $t_1$ and has no charge due to the quadrature voltage at the time $t_1$ because the quadrature voltage is the cosine component of the signal and the cosine is zero when the sine is at its maximum value. From the time $t_2$ to the time $t_3$ the capacitor 34 is charged to the peak value of the signal by the input signal voltage; during this time interval the voltage accumulated on the capacitor 33 is discharged through the armature 23 and the upper contact 27 across the input of the servo amplifier 5 (shown in Fig. 1). From the time $t_4$ to the time $t_5$ the capacitor 33 is charged to the peak value of the signal by the input signal voltage; during the time interval the voltage accumulated on the capacitor 34 is discharged through the armature 23 and the lower contact 30 across the input of the servo amplifier 5 (shown in Fig. 1). From the time $t_6$ to the time $t_7$ the capacitor 34 is charged to the peak value of the signal by the input signal voltage; during this time interval the voltage accumulated on the capacitor 33 is discharged through the armature 23 and the upper contact 27 across the input of the servo amplifier 5 (shown in Fig. 1).

The circuit output curve 42, of Fig. 6, applied to the servo amplifier input, is devoid of the quadrature component 37. The time intervals $t_3$ to $t_4$, $t_5$ to $t_6$, $t_7$ to $t_8$, $t_9$ to $t_{10}$, $t_{11}$ to $t_{12}$, $t_{13}$ to $t_{14}$, $t_{15}$ to $t_{16}$, between pulses of the output curve 42, are those in which the armatures 23 and 25 change contacts from contact 30 to 27 and from contact 28 to 31, respectively.

The circuit of Fig. 3 is that of Fig. 2 except for the double pole, double throw relay switch unit, or chopper unit 44 and the relay coils 43. The relay switch unit 44 is a compact version of the relay switch units 24 and 26 of Fig. 2 and the relay coils 43 are a compact version of the relay coils 19, 20, 21 and 22 of Fig. 2.

The quadrature voltage eliminating circuit of Fig. 3 operates in the same manner as the circuit of Fig. 2. At time $t_0$ (shown in Fig. 6) the operation of the circuit is initiated. At the time $t_0$ the switching signal actuates the relay coils 43 to close the output armature 23' to the output upper contact 30' and to close the input armature 25' to the input upper contact 28'. The armatures 23' and 25' break contact with their respective contacts 30' and 28' at the time $t_1$. At the time $t_2$, the switching signal actuates the relay coils 43 to close the output armature 23' to the output lower contacts 27' and 31' at the time $t_3$. At the time $t_4$, input armature 25' to the input lower contact 31' and to keep them closed until the time $t_3$. The armatures 23' and 25' break contact with their respective contacts 27' and 31' at the time $t_3$. At the time $t_4$, the switching signal actuates the relay coils 43 to close the output armature 23' to the output upper contact 30' and actuates the relay coils 43 to close the input armature 25' to the input upper contact 28' and to keep them closed until the time $t_5$. At the time $t_5$, the armatures 23' and 25' break contact with their respective contacts 30' and 28'. At the time $t_6$, the switching signal actuates the relay coils 43 to close the output armature 23' to the output lower contact 27' and actuates the relay coils 43 to close the input armature 25' to the input lower contact 31' and to keep them closed until the time $t_7$. At the time $t_7$, the armatures 23' and 25' break contact with their respective contacts 27' and 31'. The cycle described repeats itself as long as the circuit of Fig. 3 is in operation.

The capacitors 33 and 34 and the resistors 29 and 32 are so selected that each capacitor charges to the peak value of the signal from the time $t_0$ to the time $t_1$. The capacitor 33 is charged to the peak value of the signal from the time $t_0$ to the time $t_1$ and has no charge due to the quadrature voltage at the time $t_1$ because the quadrature voltage is the cosine component of the signal and the cosine is zero when the sine is at its maximum value. From the time $t_2$ to $t_3$ the capacitor 34 is charged to the peak value of the signal by the input signal voltage; during this time interval the voltage accumulated on the capacitor 33 is discharged through the output armature 23' and the output lower contact 27' across the input of the servo amplifier 5 (shown in Fig. 1). From the time $t_4$ to the time $t_5$ the capacitor 33 is charged to the peak value of the signal by the input signal voltage; during this time interval the voltage accumulated on the capacitor 34 is discharged through the output armature 23' and the output upper contact 30' across the input of the servo amplifier 5 (shown in Fig. 1). From the time $t_6$ to the time $t_7$ the capacitor 34 is charged to the peak value of the signal by the input signal voltage; during this time interval the voltage accumulated on the capacitor 33 is discharged through the output armature 23' and the output lower contact 27' across the input of the servo amplifier 5 (shown in Fig. 1).

The circuit output curve 42 of Fig. 6, applied to the servo amplifier input, is devoid of the quadrature component 37.

Figure 4:
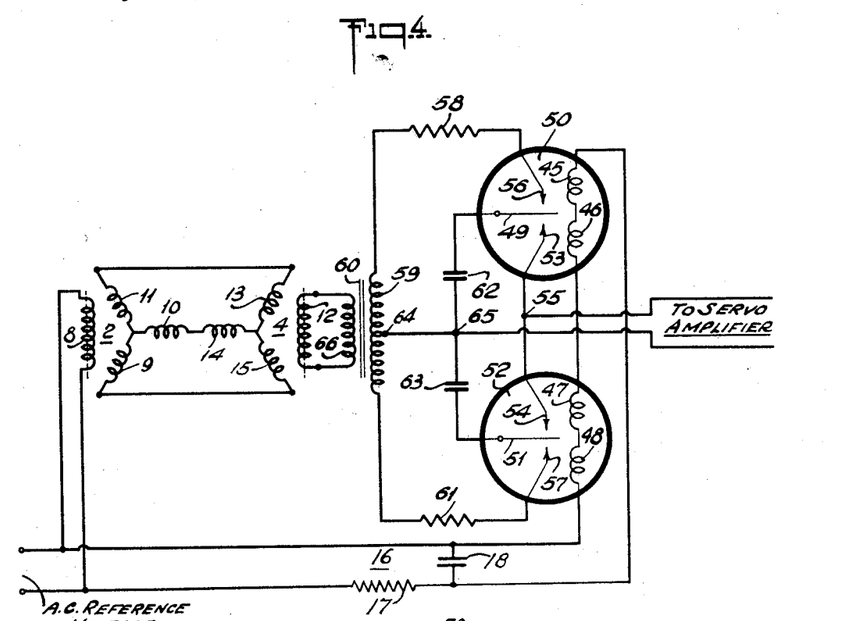
Fig. 4 is another modification of the preferred embodiment of the quadrature voltage eliminating circuit of Fig. 2.

In the modification of Fig. 4, the relays coils 45, 46, 47 and 48 are series connected in the A.C. reference signal line. The relay coils 45 and 46 are in cooperative relation with the armature 49 of the upper relay switch unit, or chopper unit 50. The relay coils 47 and 48 are in cooperative relation with the armature 51 of the lower relay switch unit, or chopper unit, 52.

The lower contact 53 of the upper relay switch unit 50 is electrically connected to the upper contact 54 of the lower relay switch unit 52. A line running to an input terminal of the servo amplifier 5 (shown in Fig. 1) makes electrical contact with the line connecting the contacts 53 and 54 at the common point 55. The upper contact 56 of the upper relay switch unit 50 is electrically connected to the lower contact 57 of the lower relay switch unit 52 through the upper resistor 58, the secondary 59 of the input transformer 60 and the lower resistor 61. The armature 49 of the upper relay switch unit 50 is electrically connected to the armature 51 of the lower relay switch unit 52 through the capacitors 62 and 63. The common potential line running to the other input terminal of the servo amplifier 5 (shown in Fig. 1) has a terminal at the center tap 64 on the transformer secondary 59 and makes electrical contact with the line connecting the capacitors 62 and 63 in series at the common contact point 65.

The synchro generator 2, having a rotor coil 8 and stator coils 9, 10 and 11 and the control transformer 4, having a rotor coil 12 and stator coils 13, 14 and 15 are connected as described in conjunction with Fig. 1 and operate as described therein. The terminals of the rotor coil 12 of the control transformer 4 are electrically connected to the primary 66 of the input transformer 60.

The operation of the quadrature voltage eliminating circuit of Fig. 4 is as follows. The synchro generator 2 and control transformer 4 operate, in a manner known in the art, to produce an amplitude modulated voltage, represented by the input signal curve 38 of Fig. 6, across the terminals of the rotor coil 12 of the control transformer. The undesirable quadrature voltage component, represented by the cosine component curve 37 of Fig. 6, is included in the input signal curve 38. The A.C. reference signal, which energizes the synchro generator, is phase-shifted by the phase shifter 16 to produce the switching signal, represented by the switching signal curve 39 of Fig. 6, which actuates the relay coils 45, 46, 47 and 48 at the proper time intervals determined by the sine component curve 36 and the input signal curve 38.

The magnitudes 40 and 41, shown with the switching signal curve 39, represent the current required to actuate the relay coils 45, 46, 47 and 48. That is, the current magnitudes 40 and 41, or 40 and −40, represent the current which must flow through any of the relay coils 45, 46, 47 and 48 before the relay coil through which it flows is actuated to draw its cooperating armature into contact with its adjacent contact. Thus, the relay coils 45 and 46 are actuated either to close the armature 49 of the upper relay switch unit 50 to contact 56 and the relay coils 47 and 48 are actuated to close the armature 51 of the lower relay switch unit 52 to contact 54 or the relay coils 45 and 46 are actuated to close the armature 49 of the upper relay switch unit 50 to contact 53 and the relay coils 47 and 48 are actuated to close the armature 51 of the lower relay switch unit 52 to contact 57.

Since the reference signal is A.C. its polarity varies from positive to negative each cycle. Since the relay coils 45, 46, 47 and 48 are all series connected, in the order listed, during one half of each cycle of the switching signal curve 39, the lower terminals of the relay coils 45, 46, 47 and 48 are negatively polarized. During this half of the cycle, the upper terminals of the relay coils 45, 46, 47 and 48 are positively polarized. During the next half cycle of the switching signal curve 39, the lower terminals of the relay coils 45, 46, 47 and 48 are positively polarized; during this half of the cycle, the upper terminals of the relay coils 45, 46, 47 and 48 are negatively polarized. Thus, relay coil 45 and relay coil 47 operate together to close their respective armatures to the contact 56 and the contact 54, respectively, and relay coil 46 and relay coil 48 operate together to close their respective armatures to the contact 53 and the contact 57, respectively.

The reference signal is phase shifted by the phase shifter by an amount determined by the sine component curve 36 and the input signal curve 38 to form the switching signal curve 39. The amount of phase shift is so determined that the switching curve 39 actuates the relay coil 45 to close the armature 49 to the upper contact 56 and actuates the relay coil 47 to close the armature 51 to the upper contact 54, at the time $t_0$, which is the time of initiation of operation of the circuit, and to keep them closed until the time $t_1$. The armatures 49 and 51 break contact with their respective contacts 56 and 54 at the time $t_1$. At the time $t_2$, the switching signal actuates the relay coil 46 to close the armature 49 to the lower contact 53 and actuates the relay coil 48 to close the armature 51 to the lower contact 57 and to keep them closed until the time $t_3$. The armatures 49 and 51 break contact with their respective contacts 53 and 57 at the time $t_3$. At the time $t_4$, the switching signal actuates the relay coil 45 to close the armature 49 to the upper contact 56 and actuates the relay coil 47 to close the armature 51 to the upper contact 54, and to keep them closed until the time $t_5$. At the time $t_5$, the armatures 49 and 51 break contact with their respective contacts 56 and 54. At the time $t_6$, the switching signal actuates the relay coil 46 to close the armature 49 to the lower contact 53 and actuates the relay coil 48 to close the armature 51 to the lower contact 57 and to keep them closed until the time $t_7$. At the time $t_7$, the armatures 49 and 51 break contact with their respective contacts 53 and 57. The cycle described repeats itself as long as the circuit of Fig. 4 is in operation.

The capacitors 62 and 63 and the resistors 58 and 61 are so selected that each capacitor charges to a peak value of the signal from the time $t_0$ to the time $t_1$. The capacitor 62 is charged to the peak value of the signal from the time $t_0$ to the time $t_1$ and has no charge due to the quadrature voltage at the time $t_1$ because the quadrature voltage is the cosine component of the signal and the cosine is zero when the sine is at its maximum value. From the time $t_2$ to $t_3$ the capacitor 63 is charged to the peak value of the signal by the input signal voltage; during this time interval the voltage accumulated on the capacitor 62 is discharged through the armature 49 and the lower contact 53 across the input of the servo amplifier 5 (shown in Fig. 1). From the time $t_4$ to the time $t_5$ the capacitor 62 is charged to the peak value of the signal by the input signal voltage; during this time interval the voltage accumulated on the capacitor 63 is discharged through the armature 51 and the upper contact 54 across the input of the servo amplifier 5 (shown in Fig. 1). From the time $t_6$ to the time $t_7$ the capacitor 63 is charged to the peak value of the signal by the input signal voltage; during this time interval the voltage accumulated on the capacitor 62 is discharged through the armature 49 and the lower contact 53 across the input of the servo amplifier 5 (shown in Fig. 1).

The circuit output curve 67, of Fig. 6, applied to the servo amplifier input, is devoid of the quadrature component 37. The circuit output curve 67 is a positive pulse curve especially suitable for D.C. servomotors driven by D.C. servo amplifiers. The common line from the center tap 64 of the input transformer secondary 59 to an input terminal of the servo amplifier 5 (shown in Fig. 1) results in the production of the circuit output curve 67 of positive polarity instead of the circuit output curve 42 of fluctuating polarity. The time intervals $t_3$ to $t_4$, $t_5$ to $t_6$, $t_7$ to $t_8$, $t_9$ to $t_{10}$, $t_{11}$ to $t_{12}$, $t_{13}$ to $t_{14}$, $t_{15}$ to $t_{16}$, beween pulses of the output curve 67, are those in which the armatures 49 and 51 change contacts from contact 56 to 53 and from contact 54 to 57, respectively.

The quadrature voltage eliminating circuit of Fig. 5 is identical to that of Fig. 2 except for the addition of the noncarrier type compensation circuit comprising the resistors 68, 69, 72, 73 and the capacitors 70 and 71. The noncarrier type compensation circuit comprises the resistor 68 in series connection in the line connecting the upper contact 27″ to the upper contact 28″, the resistor 69 in series connection in the line connecting the lower contact 30″ to the lower contact 31″, the capacitor 70 shunted across the resistor 68, the capacitor 71 shunted across the resistor 69 and the resistors 72 and 73 series connected with one another and shunted across the lines connecting the upper contact 27″ to the upper contact 28″ and the lower contact 30″ to the lower contact 31″. The line between the resistors 72 and 73 is connected to the common contact point 35″ on the common potential line from a terminal of the rotor coil 12 to an input terminal of the servo amplifier 5 (shown in Fig. 1).

The noncarrier type compensation circuit is one well known in the art and is shown in Fig. 5 for the purpose of illustration; any noncarrier type compensation circuit known in the art may be utilized in the circuit of Fig. 5.

The synchro generator 2 having a rotor coil 3 and the stator coils 9, 10 and 11 and the control transformer 4 having a rotor coil 12 and the stator coils 13, 14 and 15 are identical to those shown in Fig. 2 and are connected together and operate as described in conjunction with Figs. 1 and 2.

The phase shifter 16, having a resistor 17 and a capacitor 18, is identical to that shown in Fig. 2. The output relay switch unit 24″, having an armature 23″, contacts 27″ and 30″ and relay coils 19″ and 20″, is the same as that of Fig. 2. The input relay switch unit 26′, having an armature 25″, contacts 28″ and 31″ and relay coils 21″ and 22″, is the same as that of Fig. 2. The capacitors 33″ and 34″, the resistors 29″ and 32″, and the common contact point 35″, are the same as in Fig. 2.

The quadrature voltage eliminating circuit of Fig. 5 operates in the same manner as that of Fig. 2. The noncarrier type compensation circuit operates in a manner well known in the art.

The sine component curve 36 and the cosine component curve 37 are algebraically added to obtain the input signal curve 38. The switching signal curve 39 is determined from the sine component curve 36, the input signal curve 38 and the current magnitudes 40 and 41, in a manner described in conjunction with Fig. 2. The circuit output curve 42 for Figs. 2, 3, and 5 is determined from the switching signal curve 39, as described in conjunction with Fig. 2. The circuit output curve 67 for Fig. 4 is determined from the switching signal curve 39, as described in conjunction with Fig. 4.

The curves 36, 37, 38, 39, 42 and 67 are all on the same time basis and follow the same time divisions $t_0$, $t_1$, $t_2$, $t_3$, $t_4$, $t_5$, $t_6$, $t_7$, $t_8$, $t_9$, $t_{10}$, $t_{11}$, $t_{12}$, $t_{13}$, $t_{14}$, $t_{15}$, and $t_{16}$. All the curves are cyclical in nature and are cyclically repetitive as long as their associated circuits are in operation. The operation of the associated circuits is initiated at the time $t_0$ in each instance.

Obviously many modifications and variations of the present invention are possible in the light of the above teachings. It is therefore to be understood that within the scope of the appended claims the invention may be practiced otherwise than as specifically described.

I claim:

1. A quadrature voltage eliminating circuit adapted for connection between a signal source and a signal utilization circuit where the signal source provides a signal output that includes a first sinusoidal component and an unwanted second sinusoidal component of identical frequency but ninety degres out-of-phase with the first sinusoidal component, said circuit comprising; a first single-pole double-throw switch; a second single-pole double-throw switch; each of said switches including a first contact, a second contact, and a contactor operable to engage alternately with its said contacts; means providing a reference potential of the same frequency as said first sinusoidal component; substantially identical first and second condensers connected between said means and said first and second contacts respectively of said second switch; a first resistor connected between the first contact of said first switch and said first condenser; a second resistor substantially identical to said first resistor connected between said second contact of said first switch and said second condenser; means associated with said contactors for moving said contactors in synchronism with each other with the contactor and first contact of said first switch in contact with the contactor and second contact of said second switch are in contact and vice-versa; means connected to said contactor moving means and adapted to be connected to a source of sinusoidal energy whose frequency is equal to that of said first sinusoidal component whereby during one half cycle of the one signal component said first condenser is connected to the signal source and is charged to the peak value of that half cycle of the one signal component while the other condenser is connected to the signal utilization means and during the next half cycle of the one signal component said first condenser is connected to the signal utilization means and said second condenser is connected to the signal source and is charged to the peak value of that half cycle of the one signal component.

2. A quadrature voltage eliminating circuit adapted for connection between a signal source and a signal utilization means where the signal source provides a signal output that includes a first sinusoidal component and an unwanted second sinusoidal component of identical frequency but ninety degrees out-of-phase with the first sinusoidal component, said circuit comprising; a first single-pole double-throw switch; a second single-pole double-throw switch; each of said switches including a first contact, a second contact, and a contactor movable alternately between said contacts; means providing a reference potential; substantially identical first and second condensers connected between said means and said contactors of said first and second switches respectively; said first contact of said first switch and said first contact of said second switch being connected together; a transformer having a primary winding adapted for connection to the signal source and a secondary winding having a centertap that is connected to said means; first and second substantially identical resistors; said first resistor connected between the first contact of said first switch and one end of said secondary winding; said second resistor connected between the second contact of said second switch and the other end of said secondary winding; means associated with said contactors for moving said contactors in synchronism with each other and causing engagement of the contactor and first contact of said first switch when the contactor and second contact of said second switch are engaged, and the contactor and second contact of said first switch when the contactor and first contact of said second switch are engaged; a phase shift means connected to said means for moving said contactors and adapted for connection to a source of sinusoidal energy whose frequency is identical to the signal frequency whereby during one half cycle of the one signal component said first condenser is connected to the signal source and is charged to a level proportional to the peak value of that half cycle of the one signal component while said second condenser is connected to the signal utilization means and during the next half cycle of the one signal component said first condenser is connected to the signal utilization means and said second condenser is connected to the signal source and is charged to the peak value of that half cycle of the one signal component.

3. In a system of the type employing a signal source having two components, one of which is a desired sinusoidal component and the other of which is an unwanted sinusoidal quadrature component of identical frequency but ninety degrees out of phase with said desired component, which source is connected to two terminals of a signal utilization device to convey to the latter selected signals, that improvement for eliminating from the signal reaching said utilization device, said unwanted quadrature component, which comprises two terminals for connection to said signal source, said two terminals for connection to said utilization device, a condenser and a resistor connected in series with each other, a source of A.C. reference voltage having a frequency and phase which are identical to the signal frequency and phase, means connected to said reference voltage source and operable for electrically connecting that end of said resistor, which is opposite from that connected to said condenser, to one of said terminals for connection to said signal source during a half cycle of the desired component of a signal from said signal source and disconnecting it from said one terminal for connection to said signal source during the other half cycle of the desired component of a signal from said signal source, phase shifting means included in the connection between said reference voltage source and said second mentioned means and operable to shift through ninety degrees of phase of said reference voltage that reaches said connecting means, to place it in phase with said desired component, means for connecting to the other terminal of said signal source the side of said condenser opposite from that which is connected to said resistor and also one of the terminals for connection to said utilization device, and means also operable from said reference voltage for connecting the connection between said resistor and condenser to the other of said terminals for connection to said utilization device when said resistor is disconnected from said terminal for connection to said signal source, whereby the unwanted component of said signal will be eliminated from said signal half cycle which is delivered from said condenser to said one terminal for connection to said utilization device.

4. In a system of the type in which a servo motor is controlled by and operated automatically in a pattern corresponding to movements of a master control element, and where the controlling signal from the master element to the servo motor normally has a desired sinusoidal component and an unwanted sinusoidal quadrature component that is of identical frequency as said desired component but ninety degrees out of phase therewith, that improvement therein for substantially eliminating said quadrature component from the controlling signal that reaches said servo motor, which comprises a synchro generator and a control transformer, each with a movable coil, a source of A.C. reference voltage continuously connected to the movable coil of said synchro generator, means drivingly connecting said servo motor to said movable coil of said transformer, a pair of electromagnetically operated vibrators arranged in tandem, each having a pair of series connected electromagnet coils, spaced contacts with a contact arm moved alternately between its said contacts by changes in the direction of current through said pair of series connected coils, one contact of each of said vibrators being connected to a common side of one condenser, the other contacts of said vibrators being connected to a common side of another condenser, an individual resistor in the connection from each contact of the first vibrator to its related condenser, the other sides of said condensers being connected to said servo motor and to one end of the movable coil of said transformer, the other end of said last mentioned coil being connected to the contact arm of the first vibrator, the contact arm of the second vibrator being also connected to said servo motor; a circuit having in series therein said pairs of electromagnet coils and operable to supply thereto an A.C. reference voltage having a frequency and phase identical to the first mentioned A.C. source, means in said last mentioned circuit for shifting the phase of said reference voltage supplied to the coils of said vibrators through ninety degrees and into phase with the first mentioned A.C. voltage, said coils of said vibrators operating said contact arms to connect said other end of the movable coil of said transformer alternately through resistors to said common sides of said condensers, and open the connection from each such common side of a condenser to said servo motor while that condenser is connected to the contact arm of the first vibrator, and close it while that condenser is disconnected to the contact arm of the first vibrator, whereby the condensers are alternately charged from the transformer and discharged to said servo motor, each being discharged while the other is being charged, and the charges and discharges are made in synchronism with the phase changes.

5. In a system of the type in which a servo motor is controlled by and operated automatically in a pattern corresponding to movements of a master control element, and where the controlling signal from the master element to the servo motor normally has a desired sinusoidal component and an unwanted sinusoidal quadrature component that is of identical frequency as said desired component but ninety degrees out of phase therewith, that improvement therein for substantially eliminating said quadrature component from the controlling signal that reaches said servo motor which comprises a synchro generator and a control transformer each with a movable coil, a source of A.C. reference voltage continuously connected to the movable coil of said synchro generator, means drivingly connecting said servo motor to said movable coil of said transformer, a pair of individual condensers, a pair of individual resistors, a source of A.C. reference voltage having the same frequency and phase as that supplied to said movable coil of said synchro generator, a circuit supplied with reference voltage from said last specified source having therein phase shifting means for shifting the phase of the voltage in this circuit through ninety degrees and into phase with the voltage in one of said movable coils and also having means responsive to the phase-shifted voltage for alternately charging each of said condensers, through a resistor, from said movable coil of said transformer and alternately discharging each condenser to said servo motor in synchronism with said phase-shifted reference voltage, with each charged condenser being discharged while the other condenser is being charged, and with the start of the charge of each condenser occurring when the quadrature voltage in the movable coil of the transformer is at substantially zero, and with the end of the charge supplied to each condenser occurring when the signal voltage only from the movable coil of the transformer is applied to that condenser.

6. In a control system in which a synchro generator is conductively coupled to a control transformer and a servo motor is mechanically coupled to said transformer to orient the latter relatively to said generator in response to signals transmitted from said transformer to said motor, which signals have a desired sinusoidal component and an unwanted sinusoidal quadrature component of identical frequency as said desired component but ninety degrees out of phase therewith, that improvement therein for the elimination of the effect of said unwanted component on the servo motor which comprises said generator, said transformer, said motor, a first source of A.C. voltage connected to said generator, a source of A.C. reference voltage of the same frequency and phase as said first source, means connected to said transformer and to said motor and responsive to reversals in voltage of said reference voltage for storing signal energy from said transformer alternately in each half cycle of the signal and discharging to said motor the stored energy from each half cycle while emergency from the other half cycle is being stored, and phase shifting means in the connection from said storing and discharging means to said source of reference voltage and operable to shift the phase of said reference voltage reaching said storing and discharging means to that of said first source, and said storing and discharging means operating to interrupt the storage of energy in each half cycle of said desired component while said quadrature voltage component is substantially at zero voltage, whereby the energy stored and discharged to said motor will be only that of said desired component.

7. The system as set forth in claim 6, wherein said sources of A.C. voltage are the same.

8. In a control system in which a synchro generator is conductively coupled to a control transformer and a servo motor is mechanically coupled to said transformer to orient the latter relatively to said generator in response to signals transmitted from said transformer to said motor, which signals have a desired sinusoidal component and an unwanted sinusoidal quadrature component of identical frequency as said desired component but ninety degrees out of phase therewith, that improvement therein for the elimination of the effect of said unwanted component on the servo motor which comprises said generator, said transformer, said motor, a source of A.C. voltage connected to said generator to supply operating voltage thereto, two energy storing elements, switch means for connecting said elements alternately to said transformer to receive signal voltages therefrom and store them, one half cycle of the voltage in one element and the other half cycle in the other element, and also connected to said motor for delivering the stored energy in each element to said motor while energy is being stored in the other element, a source of A.C. reference voltage of the same frequency and phase as said first mentioned voltage, means powered by said reference voltage for operating said switch means to cause said alternate storages of energy concurrently with the variations in the voltage energy received by the switch means from said transformer, and with the switch means closing and opening the circuit to each storing means solely while the quadrature voltage is approximately nil, whereby the signal energy stored and discharged to said motor will be substantially free of the influence of said quadrature voltage, and means for delaying the transfer of energy included in the connection between said transformer and each of said elements for delaying maximum storage of energy in each element until close to the time of operation of said switch means so that interruption of the storage of energy in an element occurs when the voltage of the energy being stored is close to a maximum.

9. In a control system in which a synchro generator is conductively coupled to a control transformer and a servo motor is mechanically coupled to said transformer to orient the latter relatively to said generator in response to signals transmitted from said transformer to said motor, which signals have a desired sinusoidal component and an unwanted sinusoidal quadrature component of identical frequency as said desired component but ninety degrees out of phase therewith, that improvement therein for the elimination of the effect of said unwanted component on the servo motor which comprises said generator, said transformer, said motor, a source of A.C. voltage connected to said generator to supply operating voltage thereto, two energy storing elements, switch means for connecting said elements alternately to said transformer to receive signal voltages therefrom and store them, one half cycle of the voltage in one element and the other half cycle in the other element, and also connected to said motor for delivering the stored energy in each element to said motor while energy is being stored in the other element, a source of A.C. reference voltage of the same frequency and phase as said first mentioned voltage, and means powered by said reference voltage for operating said switch means to cause said alternate storages of energy concurrently with the variations in the voltage energy received by the switch means from said transformer, and with the switch means closing and opening the circuit to each storing means solely while the quadrature voltage is approximately nil, whereby the signal energy stored and discharged to said motor will be substantially free of the influence of said quadrature voltage, said storage elements being capacitors, and said delaying means including a resistance for retarding the maximum build up of voltage on each condenser until close to the time when said related switch means operates to disconnect that condenser from said transformer.

10. In a servo system of the type in which a synchro generator supplied with an A.C. voltage is conductively connected to a control transformer, and orientation of the latter with the former is produced through a servo motor mechanically coupled to the transformer to orient it in accordance with signals from said transformer to said motor caused by operation of said generator out of orientation relatively to said transformer, that improvement therein for substantial nullification of the influence on the servo motor of the quadrature voltage component in the signal from said transformer, leaving the desired component of said A.C. voltage in said signal for operation of said motor, which comprises the combination with said generator, transformer and servo motor of two energy storing elements, one switch means for connecting said transformer alternately to said elements, another switch means for connecting said elements alternately to said motor, electromagnetic means for operating both of said switch means concurrently to connect one element to said transformer and also connect the other element to said motor, and vice versa, means for activating said electromagnetic means to cause operations of said switch means in approximate phase with reversals in said A.C. voltage and causing an opening of the switch means connecting each element to said transformer while said quadrature voltage component is substantially zero, whereby the energy stored in each element will be substantially only that of the desired component of the voltage delivered to said element.

11. The system as set forth in claim 10, wherein said energy storing elements, store voltage charges, and resistor means in the connection including said transformer and each energy storing element for retarding each build up to a maximum of stored voltage in each element until near to the operation of said switch means that disconnects that element from said transformer, and thus provides delivery of relatively high voltage signals to said motor.

12. The system as set forth in claim 10, wherein said electromagnetic means has two parts, one for each switch, connected in series, and each of said switch means has a switch member movable alternately between a pair of spaced apart contacts by each reversal of current in said electromagnetic means, with the switch member movable through a substantial distance between said contacts while out of engagement with both of said contacts whereby there is a small time interval at each reversal of said A.C. voltage during which no voltage signal is delivered to said motor and said quadrature voltage is alternately increasing in opposite directions.

13. In a servo system of the type in which a synchro generator supplied with an A.C. voltage is conductively connected to a control transformer, and orientation of the latter with the former is produced through a servo motor mechanically coupled to the transformer to orient it in accordance with signals from said transformer to said motor caused by operation of said generator out of orientation relatively to said transformer, that improvement therein for substantial nullification of the influence on the servo motor of the quadrature voltage component in the signal from said transformer, leaving the desired component of said A.C voltage in said signal for operation of said motor, which comprises the acts of separately storing energy charges from said transformer alternately for each half cycle of the signal in phase with the A.C. voltage supplied to said generator, terminating each storage act when the quadrature voltage is substantially zero, discharging to said servo motor each separately stored energy charge while the alternate energy charge is being stored, controlling said charging and discharging by said A.C. voltage, and shifting said controlling voltage into phase with the A.C. voltage supplied to said generator.

14. In a servo system of the type in which the rotor coil of a synchro generator is continuously supplied with an A.C. voltage from a selected source, the stator coils of the generator are conductively connected to corresponding stator coils of a control transformer, and the rotor coil of the transformer is connected to a servo motor that is drivingly coupled to the rotor coil of the transformer to orient it relatively to the rotor coil of the generator, that improvement therein for nullifying the effect on the servo motor of the quadrature voltage formed in the rotor coil of said transformer, which comprises two individual elements for storing energy, switch means for connecting each of said elements alternately to the rotor coil of said transformer to receive and store energy charges therefrom, and to said servo motor to deliver stored charges thereto, with each of said elements connected to said rotor coil when the other of said elements is connected to said servo motor and vice versa, means for operating said switch means at the same frequency and phase as said A.C. voltage supplied to said generator, with said switch means having a short time interval between a break of the connection from an element to said rotor coil of the transformer and the delivering of the stored energy charge to said motor, and breaking the connection from each said element to said transformer rotor coil before the end of each half cycle and while the quadrature voltage in the transformer rotor coil is approximately zero, whereby the energy charge delivered from each element to the motor will be substantially fre of the effect of the said quadrature voltage.

15. The system as set forth in claim 14, wherein said means for operating said switch means includes electromagnetic means, and said switch means includes spaced apart contacts and a switch arm movable alternately between said contacts by reversals in the direction of current through said electromagnetic means, said operating means also having a source of A.C. voltage in phase with the A.C. voltage supplied to said generator.

16. The system as set forth in claim 14 wherein said switch means includes two switches, each having a pair of spaced apart contacts and a switch arm movable alternately between said contacts, and said operating means for said switch means includes electromagnetic means for moving said switch arms back and forth between said contacts with each reversal of current through said electromagnetic means, a connection from said A.C. voltage source, to said electromagnetic means, and phase shifting means including in said last mentioned connection and operable for shifting the phase of the voltage supplied to said electromagnetic means to that of said voltage applied to said generator rotor coil.

References Cited in the file of this patent

UNITED STATES PATENTS

| | | |
|---|---|---|
| 1,014,466 | Hamann | Jan. 9, 1912 |
| 2,569,698 | Shepard | Oct. 2, 1951 |
| 2,619,514 | Stanton | Nov. 25, 1952 |
| 2,697,191 | Wannamaker | Dec. 14, 1954 |
| 2,769,126 | Pellecchia | Oct. 30, 1956 |
| 2,832,020 | Towner | Apr. 22, 1958 |

UNITED STATES PATENT OFFICE

CERTIFICATE OF CORRECTION

Patent No. 2,917,690                      December 15, 1959

Anthony F. Magaraci

It is hereby certified that error appears in the printed specification of the above numbered patent requiring correction and that the said Letters Patent should read as corrected below.

Column 6, line 72, strike out "tacts $27'$ and $31'$ at the time $t_3$. At the time $t_4$," and insert instead -- tact $27'$ and actuates the relay coils 43 to close the --; column 13, line 47, for "emergency" read -- energy --.

Signed and sealed this 13th day of September 1960.

(SEAL)
Attest:

KARL H. AXLINE                             ROBERT C. WATSON
Attesting Officer                           Commissioner of Patents